United States Patent [19]

Revells

[11] 4,116,662
[45] Sep. 26, 1978

[54] GLASS SHEET SUPPORTING AND CONVEYING APPARATUS

[75] Inventor: Robert G. Revells, Toledo, Ohio

[73] Assignee: Libbey-Owens-Ford Company, Toledo, Ohio

[21] Appl. No.: 835,720

[22] Filed: Sep. 22, 1977

[51] Int. Cl.² ............................................. C03B 23/02
[52] U.S. Cl. ...................................... 65/289; 65/273; 65/287; 198/780
[58] Field of Search ................. 65/107, 273, 287, 289, 65/114, 104, 349, 350, 351, 286; 198/780

[56] References Cited

U.S. PATENT DOCUMENTS

| 3,545,951 | 12/1970 | Nedelec | 65/273 |
| 3,905,794 | 9/1975 | Revells et al. | 65/273 |
| 4,015,968 | 4/1977 | Revells et al. | 65/289 |
| 4,047,915 | 9/1977 | Oelke et al. | 65/273 |

FOREIGN PATENT DOCUMENTS 2,221,409  3/1973  France ........................ 65/107

*Primary Examiner*—Arthur D. Kellogg
*Attorney, Agent, or Firm*—Collins, Oberlin & Darr

[57] ABSTRACT

An apparatus for supporting and conveying glass sheets in a bending apparatus on a series of uniquely shaped conveyor rolls between narrow and/or irregularly shaped press members in a manner avoiding contact with the lower press member upon vertical displacement thereof. Each conveyor roll is formed of two sections rigidly interconnected to form a solid, unitary structure, each section having a load carrying, rotatable sleeve individually driven to convey the glass sheets thereon.

15 Claims, 13 Drawing Figures

4,116,662

GLASS SHEET SUPPORTING AND CONVEYING APPARATUS

BACKGROUND OF THE INVENTION

The present invention relates generally to glass supporting and conveying apparatus and, more particularly, to specially configured, pivotal conveyor rolls especially adapted for use in press bending apparatus.

Generally, in the commercial production of curved or bent glass sheets in large quantities, such as is encountered in the mass production of glazing closures for automobiles and the like, the sheets are supported in a horizontal plane and advanced on externally driven roll-type conveyors in a horizontal path successively through a heating area, a bending area and a heat treating area for annealing or tempering the bent sheets.

The heated glass sheets are advanced from the heating furnace into the bending area and accurately located therein between complemental upper and lower shaping members by the engagement of the leading edges thereof with locating stops positioned in the path of movement of the advancing sheets. When properly oriented, the sheet is engaged along its marginal edge portions by the lower press member and lifted from the conveyor rolls for pressing between the complemental shaping surfaces of the press members to the desired curvature.

The lower or female press member is generally of ring-type construction having a shaping rail which engages only the marginal portions of the sheets. To permit the lower press members' shaping rail to be moved vertically above and below the conveyor, the shaping rail is comprised of a number of individual segments arranged in an end-to-end relation in the desired outline pattern with adjacent ends of the segments being spaced apart to permit the segments to move between the rolls of the conveyor. The shaping rails generally are of a substantially rectangular configuration in plan so that two sides of the shaping rail can be formed of continuous segments extending parallel to the rolls and the other two sides of the rail, which extend normal to the rolls, being formed of short segments spaced apart a distance only slightly greater than the diameter of the rolls. Accordingly, with a rectangular or substantially rectangularly configured shaping rail, the spaces or gaps defined between adjacent segments can be held to a minimum with no significant, if any at all, sagging of the heat-softened glass into the spaces between adjacent segments. However, with the advent of more complex and elaborate glass shapes of widely varying outlines, the required similarly configured shaping rails often have portions intersecting the rolls at acute angles whereby the spacing between adjacent shaping rail segments must be increased to the extent that they pose problems in accurately imparting the desired curvatures or shapes to the glass by the horizontal press bending procedure because of the tendency for the heat-softened glass sheets to sag between the widely spaced-apart shaping rail segments.

SUMMARY OF THE INVENTION

Accordingly, it is a primary object of the present invention to obviate the above disadvantages by providing an improved apparatus for supporting and conveying glass sheets in a press bending apparatus.

It is another object of this invention to provide improved conveyor rolls provided with novel configurations for use in conjunction with press bending members of irregular outlines.

It is still another object of the present invention to provide specially configured conveyor rolls shaped to avoid interference with the supporting and shaping function of the lower press bending member during relative vertical movement therebetween.

It is a further object of this invention to provide uniquely shaped conveyor rolls, each being formed of two sections individually driven for rotation but rigidly interconnected in a manner requiring only a minimum of clearance openings in the associated press shaping rail to accommodate relative vertical movement therebetween.

The foregoing and other objects, advantages, and characterizing features of the present invention will become clearly apparent from the ensuing detailed description of illustrative embodiments thereof, taken together with the accompanying drawings wherein like reference numerals denote like parts throughout the various views.

DESCRIPTION OF THE PREFERRED EMBODIMENT

Figure 1:
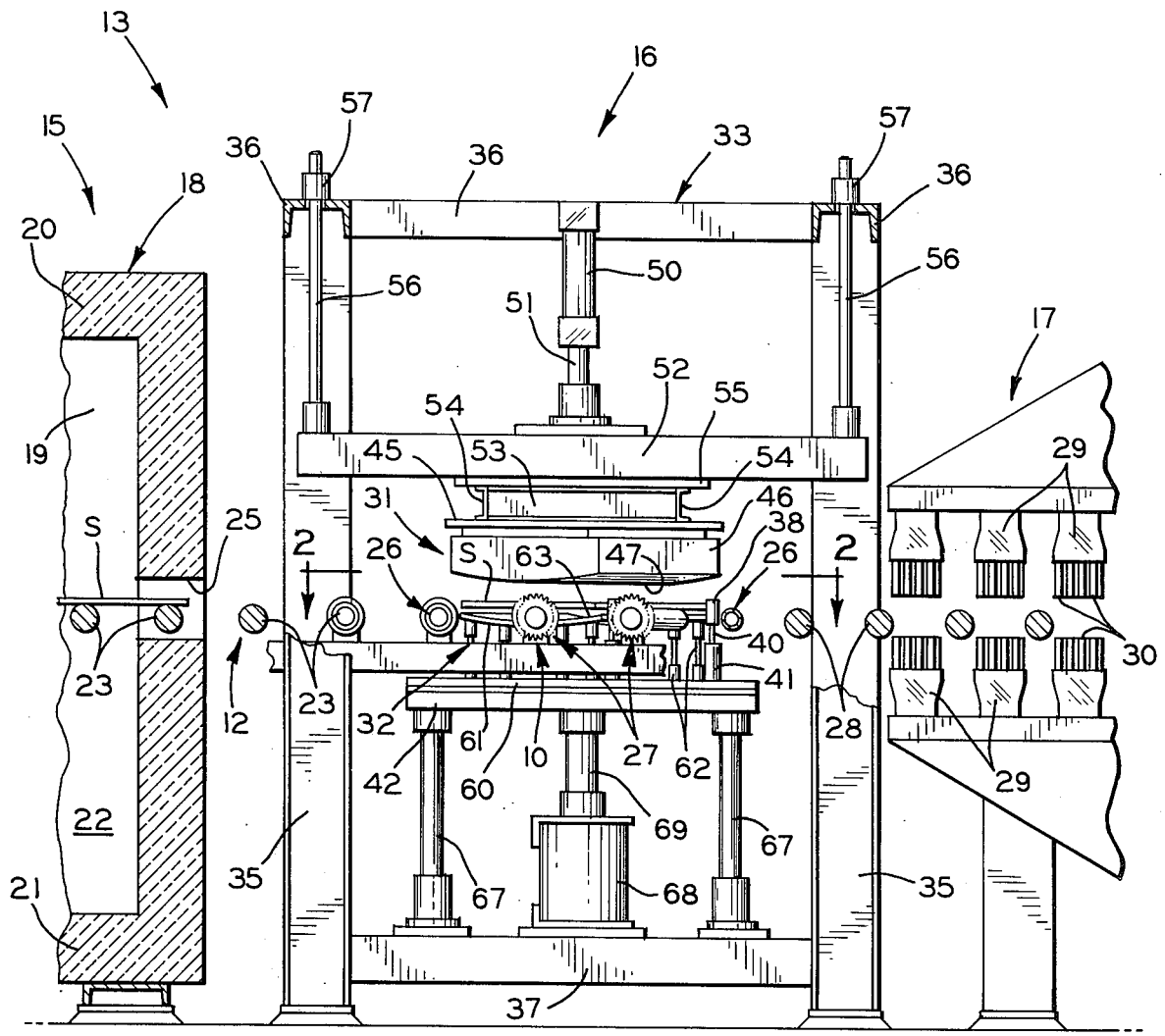
FIG. 1 is a side elevational view of a bending apparatus interposed between a glass heating and glass tempering station and embodying the glass supporting and conveying apparatus of this invention.

Referring now in detail to the illustrative embodiment depicted in the accompanying drawings, there is shown in FIG. 1 one form of a glass sheet supporting and conveying apparatus, generally designated 10, constructed in accordance with this invention and forming a part of a continuous conveyor system, comprehensively designated 12. The conveyor system 12 forms a component part of a bending and tempering apparatus, generally designated 13, particularly adapted for use in the production of bent, tempered glass sheets by a continuous process in which the sheets to be treated are supported and move successively along a predetermined horizontal path on conveyor system 12 through a heating section 15, a bending section 16, and a tempering section 17, these sections being contiguous so that a sheet passes immediately from one section to the next succeeding section.

In the illustrative embodiment, the heating section 15 comprises a tunnel-type furnace 18 having a heating chamber 19 defined by a top wall 20, a bottom wall 21, and opposite side walls 22, all formed of a suitable refractory material. The chamber 19 can be heated in any desired manner by suitable heating means, such as gas fired burners or electrical resistance elements for example (not shown), located in the top and side walls of the furnace 18. The sheets S are advanced through the heating chamber 19 on a series of conveyor rolls 23, which form a part of the conveyor system 12, and extend from the entrance end (not shown) of the furnace 18, through an oppositely disposed exit end and towards the bending section 16. The sheets S are heated to substantially the softening point of the glass during their passage through the chamber 19 and, upon emerging from an opening 25 in the exit end of the furnace 18, are directed into the bending area via a second series of conveyor rolls constituting the supporting and conveying apparatus 10 of this form of the invention. The supporting and conveying apparatus 10 comprises a pair of outer rolls 26 and a pair of inner, specially configurated rolls 27, which collectively move the sheets into and within the bending section 16 between a pair of press members, hereinafter more fully described, and which impart the desired curvature to the sheet S.

After bending, the sheets S are advanced along the path and are transferred from the conveying apparatus 10 onto a third set of conveyor rolls 28, forming a part of the conveyor system 12, and which move the bent sheets S into and through the tempering section 17 wherein their temperature is rapidly reduced to produce the proper temper in the glass. In the embodiment illustrated in FIG. 1, the tempering section 17 includes cooling means comprising upper and lower blastheads 29 disposed above and below the path of movement of the glass sheets and which are provided with a series of tubes 30 operable to direct opposed streams of cooling fluid, such as air or the like, toward and against the opposite surfaces of the sheets S moving along such path.

The bending apparatus comprises an upper male press member 31 and a lower female press member 32 having opposed complemental shaping surfaces conforming to the desired curvature of the sheet to be bent. The press members 31 and 32 are mounted for relative movement toward and away from each other on a structural frame 33, which includes a framework of vertically disposed columns 35 and horizontally extending beams 36 interconnected and tied together to form a rigid, box-like structure. A base member 37 extends between the upright columns 35 adjacent the lower ends thereof for supporting the female press member 32 and associated parts. The male press member 31 is mounted above the conveyor rolls 26 and 27 for vertical reciprocal movement relative to frame 33 while the female press member 32 is located below the conveyor rolls 26 and 27 and mounted for vertical reciprocal movement toward and away from the male press member 31.

A pair of laterally spaced locator stops 38 are positioned in the path of movement of the advancing glass sheets S to accurately position the same in the desired location relative to the press members 31 and 32. Each stop 38 is secured to the distal end of a piston rod 40 of a fluid actuating cylinder 41 mounted on a carriage 42. The cylinders 41 are operative to raise and lower the stops 38 between an upper position above conveyor rolls 27 and the path of movement of the glass sheet S and a lower position therebeneath.

In the illustrated embodiment shown in FIG. 1, the male press member 31 is provided with a base member 45 for supporting a mold element 46 having a downwardly directed, generally convex shaping surface 47 on the lower surface thereof to impart the desired curvature to the sheet. The particular outline of the shaping surface 47 of mold element 46, as well as the specific curvature thereof, is dictated by the desired shape of the glass sheet being bent and can vary widely, as desired. Also, a male mold of outline or ring-type construction may be used in lieu of the continuous shaping surface-type shown, if desired.

The means for supporting the male press member 31 on frame 33 includes at least one actuating cylinder 50 (FIG. 1) mounted on one of the upper horizontal beams 36 and having a suitable reciprocal piston (not shown) provided with a piston rod 51 connected at its outer end to a vertically reciprocable platen frame 52. The base member 45 of the male press member 31 is connected to the platen frame 52 for movement therewith by means of interconnected structural members 53 and 54 and a support plate 55 attached to the underside of the platen frame 52. A plurality of guideposts 56 are connected at their lower ends to the four corners of platen frame 52, respectively, and extend upwardly through suitable bushings 57 mounted on upper horizontal beams 36 for sliding movement relative thereto to properly guide platen frame 52 during its vertical reciprocal movement.

The female press member 32 is of an outline or ring-type construction and comprises a base member 60 secured to the carriage 42 and a shaping rail 61 connected to the base member 60 in spaced relation thereto by means of a series of connecting rods 62. The shaping rail 61 conforms in outline to the glass sheets S to be bent and is provided on its upper face with a generally concave shaping surface 63 complementary to the male press member shaping surface 47 in opposed relation thereto. As shown in the illustrative embodiment of FIG. 2, the shaping rail 61 is of a rectangular shape in plan with two opposite long side portions 65 and two opposite short side portions 66 to accommodate elongated, very narrow glass sheets S. Further details of the shaping rail 61, as well as its orientation relative to the conveyor system, will hereinafter be more fully explained.

The carriage 42 is supported by a pair of guide members 67 (FIG. 1) and vertically movable by a fluid actuator 68 mounted on base member 37 and having a suitable piston rod 69 for raising and lowering the female press member 32 between its lower position beneath conveyor rolls 26 and 27 and its upper position thereabove for lifting a heated glass sheet S from the rolls and pressing the same against the male press member 31 between the complemental shaping surfaces 47 and 63, thus forming the glass sheet into the desired curvature. After bending, piston rod 69 is retracted to lower the female press member 32 below the conveyor rolls, depositing the bent sheet thereon for advancement into the tempering section 17.

Conventionally, the conveyor rolls located in the press bending section and utilized in conjunction with the lower press member for conveying and supporting the glass sheets immediately prior to and after the bending operation are straight rolls of uniform diameter which extend transversely of the path of travel of the glass sheet. Flexible rolls have sometimes been used in the press area to enable the rolls to assume the curvatures imparted to the glass sheets when deposited thereon after bending. More recent roll designs have included rolls provided with central, arcuately curved portions which are disposed in a common horizontal plane for supporting a flat sheet prior to bending and which are pivotal downwardly at angular attitudes to such common plane for conjointly defining a supporting surface complementary to the curvature imparted to the sheet for receiving the same after bending.

In all of the above known arrangements, the female press member, which is of outline or ring-type construction and located beneath the conveyor rolls, is provided with a shaping rail made up of a plurality of segments arranged in an end-to-end relation in the desired outline pattern with adjacent ends of the segments being spaced apart sufficiently to pass between adjacent rolls to permit displacement of the shaping rail above the level of the conveyor rolls for the bending operation.

In order to avoid sagging of the heat-softened glass sheets into the spaces between segments and thereby abort deformation control, the spacing between adjacent segments were kept to a minimum by the following expedients. The diameters of the conveyor rolls in the bending area were made relatively small thereby requiring only a minimum spacing between the shaping rail segments. Moreover, since the glass sheets to be bent were generally rectangular or trapezoidal in outline with at least two substantially parallel edges, two opposite sides of the shaping rail were arranged to extend parallel to the rolls in spaced relation thereto and could therefore be made continuous. Accordingly, only the two remaining sides of the shaping rail had to be segmented and because they usually extended substantially perpendicularly to the rolls, the spacing between adjacent segments could be kept relatively small to preclude sagging between said segments. Thus, the shaping rails offered adequate support and bending control for the heat-softened glass sheets, notwithstanding the interruptions therein formed by the relatively small open spaces between adjacent segments.

While the above known apparatus functions admirably for its intended purpose when press bending relatively wide sheets of conventional outline configurations, problems are encountered in processing relatively narrow glass sheets in a horizontal press bending operation as will be presently pointed out, or glass sheets having complex configurations in plan as will be subsequently explained.

The problem encountered by narrow sheets, for example, in a horizontal press bending operation resides in adequately supporting the sheet on the conveyor rolls while providing the female press member with a sufficient shaping surface to impart the desired curvature to the narrow sheet. It should be understood that the sheet must be supported on at least two adjacent rolls in order to prevent its toppling off between adjacent rolls. Simply locating the conveyor rolls in closer proximity to each other does not solve the problem because the spacing between adjacent rolls in the press area is dictated by the number of open spaces or interruptions that can be tolerated in the short sides of the shaping rail without sacrificing deformation control.

Figure 2:
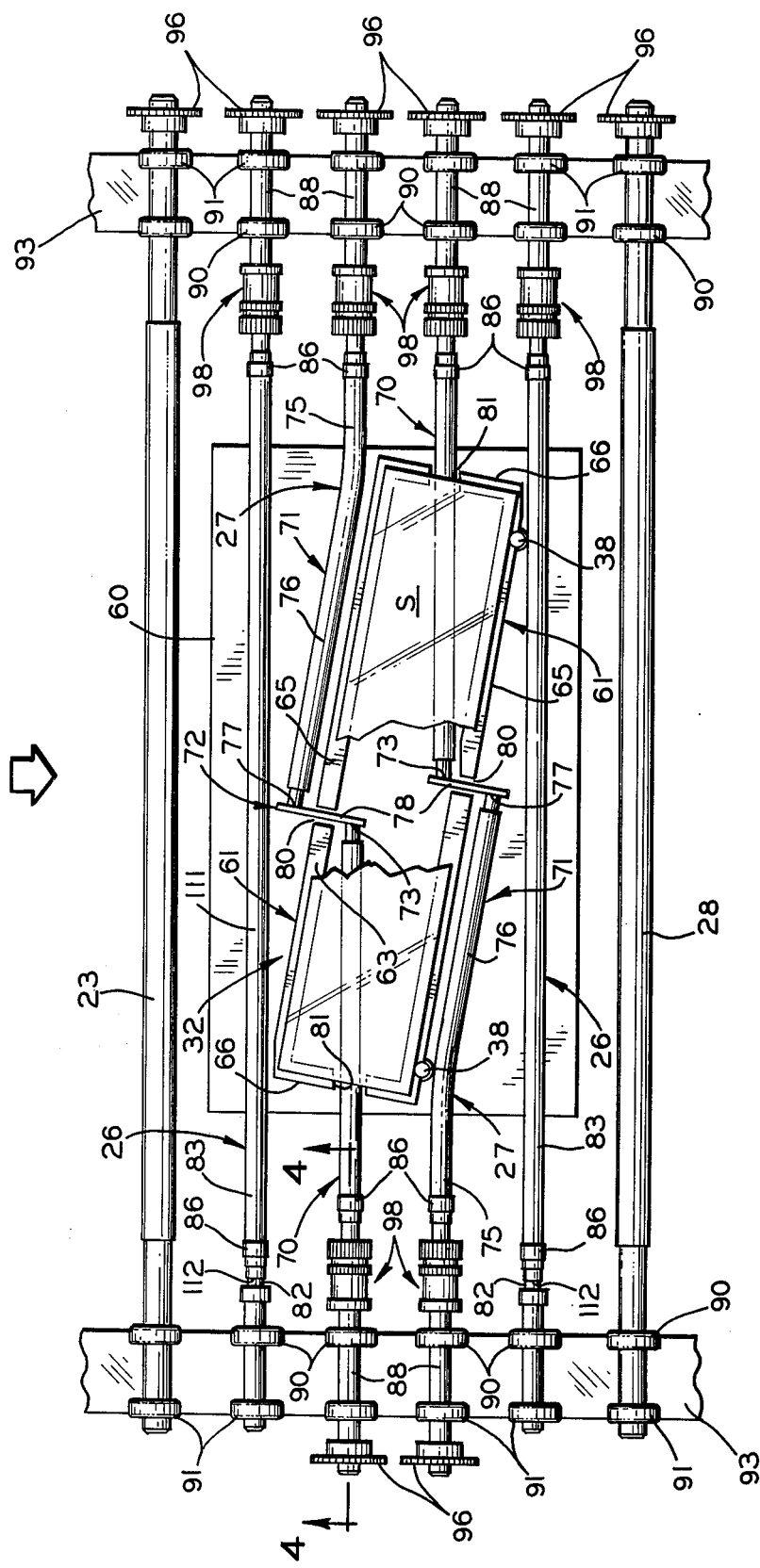
FIG. 2 is a partial top plan view on an enlarged scale, looking in the direction of arrows 2—2 of FIG. 1, and showing the conveyor rolls in relation to the shaping rail of the lower press member.

Accordingly, to assure proper support for the relatively narrow glass sheet, the latter must be oriented in an askew position relative to the axes of the rolls, i.e. with the longitudinal axis of the sheet extending obliquely or at an angle to the axes of the transversely extending rolls. As a result, the press members must be similarly oriented to accommodate the askew sheet, such as is shown in FIG. 2. However, the roll clearance spaces, especially in the long sides of the lower press shaping rail, necessary to accommodate conventional straight rolls would be enlarged to the extent allowing the heat-softened glass to sag therein and seriously impair, if not completely abort, controlled shaping of the narrow sheet. The shaping surface, interrupted by these large clearance spaces, would not be adequate to impart the desired shape or curvature to the sheet.

Figure 3:
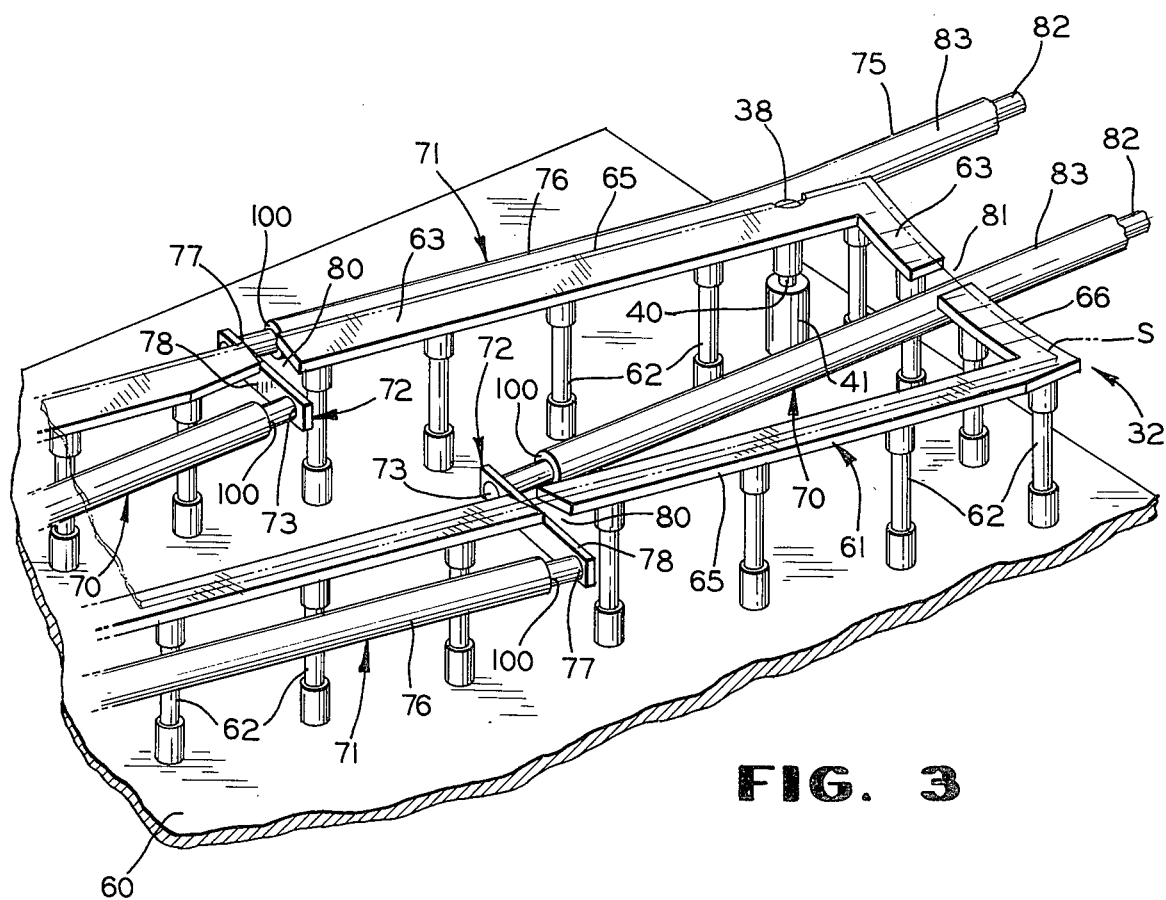
FIG. 3 is a fragmentary perspective view of one form of conveyor rolls constructed in accordance with this invention.

According to one form of the present invention, the above noted problem is obviated by the use of specially configurated, segmented conveyor rolls 27 employed in the bending area. As best shown in FIGS. 2 and 3, each conveyor roll 27 comprises two sections 70 and 71 joined together at their inner ends by connector means 72. Section 70 extends in a straight horizontal direction transversely of the path of movement of the glass sheet and terminates in an inner end 73. Section 71 is provided with a straight outer end portion 75 in coaxial alignment with section 70 and a laterally bent portion 76 disposed in the same horizontal plane as section 70 but terminating in an inner end 77 laterally offset from the inner end 73 of section 70. These inner ends 73 and 77 are rigidly secured together by connector means 72, which is in the form of an elongated, thin bar 78 bridging the inner ends 73 and 77 of conveyor roll section 70 and 71, respectively.

The two rolls 27 mounted in the press area are oppositely oriented with the straight section 70 of the leading roll 27 being located at the left as viewed in FIG. 2 and the straight section 70 of the trailing roll 27 being located at the right. The angular attitudes of the bent portions 76 of section 71 preferably are designed to be disposed in a parallel, spaced relation to the long side portions 65 of shaping rail 61 so as not to disturb or interfere with the integrity thereof. As a result, only one clearance space 80 is necessary in each long side portion 65 of shaping rail 61 to permit vertical movement thereof past conveyor rolls 27 and this space 80 is kept to a minimum by disposing the connector bar 78 in a direction perpendicular to the longitudinal axis of such long side portion 65. This, together with only one clearance space 81 in each of the shaping rail's short side portions 66 does not adversely affect the integrity of the shaping surface 63 so that sufficient shaping surface 63 remains to accurately and precisely control glass deformation.

Figure 4:
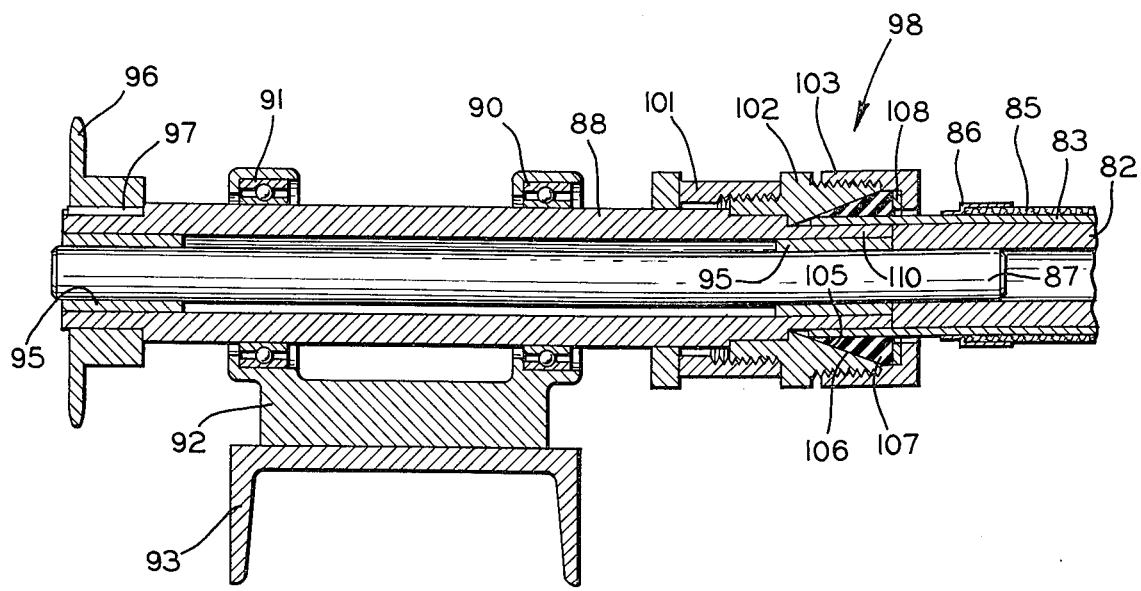
FIG. 4 is a vertical cross sectional view, on an enlarged scale, taken along the line 4—4 of FIG. 2.

With reference to FIGS. 3 and 4, each roll section comprises an inner, hollow, flexible, substantially stationary core member 82 and an outer, flexible, load-carrying, rotatable sleeve 83. To facilitate rotation of the outer sleeve 83 about core 82, the former may be comprised of a liner formed of a suitable anti-friction material, such as fluorocarbon resin for example, covered with a layer of stainless steel mesh to reinforce the same and prevent kinking thereof. While the outer sleeve 83 is flexible for conforming to the bent shape of the inner core 82, it is capable of transmitting torque without significant axial twist or distortion. The sleeve 83 can be covered with an asbestos or fiber glass material 85 (FIG. 4) to provide a resiliently yieldable, heat resistant, non-marring surface upon which the glass sheets are received. The covering is secured by stretching it over the sleeve 83 and fastening the ends thereto with pressure sensitive tape 86 or in some other suitable manner.

The outer end of the inner core 82 of each roll section 70, 71 is telescopically received upon and secured to a stub shaft 87 (FIG. 4) mounted in a rotatable collar 88 journalled for rotation in spaced bearings 90 and 91 mounted on a common block 92 carried on a support rail 93 along each side of the bending apparatus. Suitable sleeve bushings 95 are interposed between the stub shaft 87 and collar 88 to facilitate relative rotation therebetween. A pinion 96, adapted to be driven by a suitable endless drive chain (not shown) is rigidly secured to collar 88 by means of a key 97. The pinions 96 on opposite ends of conveyor rolls 27 are operatively connected together in a conventional manner for rotating the opposed sections 70 and 71 in unison at the same angular speed about their respective chordal axes.

One end of the outer sleeves 83 of each section 70, 71 is attached to the collar 88 by a coupling member, generally designated 98, while the opposite end of sleeve 83 is left free, as best shown at 100 in FIG. 3, for free rotation relative to its associated core member 82. Coupling member 98 comprises a tubular body 101 welded or otherwise fixedly secured on collar 88 and threaded on one end of a specially configured, union connecting member 102. The other end of male threaded member 102 receives a female connecting member 103 disposed about the outer sleeve 83 for attaching the latter to its respective collar 88.

The internal surface 105 of the union member 102 adjacent one end thereof is tapered in order to engage the outer, conically shaped, complemental surface 106 of a gripping sleeve 107 having a bore for receiving the outer sleeve 83 therethrough. The gripping sleeve 107 is formed of rubber or any other suitable resiliently yieldable, elastomeric material and when compressed radially, exerts a radial clamping force on the outer sleeve 83. The rear end of gripping sleeve 107 is flat and bears against a washer 108 interposed between gripping sleeve 107 and the rear end wall of the female connector member 103.

In attaching the outer sleeve 83 to collar 88, the reduced diameter end portion 110 thereof is telescopically received in the end of sleeve 83. The female connector 103 is then threaded onto the union member 102, urging the gripping sleeve 107 radially inwardly for clamping the outer sleeve 83 against the reduced diameter end portion 110 of collar 88. In this manner, the outer sleeves 83 of the roll sections are attached to their respective collars 88 for rotation about their own chordal axes, respectively, relative to their inner cores 82. Thus, the outer end of the sleeve 83 of each roll section 70, 71 is operatively connected to a drive train via coupling 98 while the inner end 100 of the sleeve terminates substantially inwardly of the end of its associated core member 82 and remains disconnected for free rotation thereabout. The inner ends 73, 77 of each pair of roll sections 70, 71 in turn, are fixed in place and connected to each other via connecting bar 78.

The outer pair of conveyor rolls 26 (FIG. 2) located in the bending area consist of only one straight, elongated section 111 extending completely across the bending area. Similarly to the sections 70, 71 of conveyor rolls 27, roll 26 is comprised of a fixed inner core 82 and an outer rotatable sleeve 83 but is driven from one end only as shown in FIG. 2, the other end of sleeve 83 terminating in a free end 112 rotatable about its core 82. Since the detailed construction of roll 27 and its sleeve one end connection to coupling member 98 is similar to that of sections 70, 71, no further amplification or description is believed necessary and the same reference characters are applied to identify similar parts. The diameter of rolls 26 are equal to the diameter of roll sections 70, 71, which, compared to the other rolls of the conveyor system 12, are formed smaller so that the clearance spaces provided in the shaping rail can be held to a minimum and yet permit relative vertical movement between the rolls and the shaping rail.

In operation, a flat, elongated, narrow glass sheet S is loaded onto the conveyor rolls 23 at the entrance end (not shown) of the furnace 18 in a manner orienting the longitudinal axis thereof at a slight angle to the axes of the rolls. The sheet is advanced in this askew orientation through the heating chamber 19 wherein it is heated to substantially the softening point or bending temperature of the glass. This heated sheet passes through the opening 25 and is transferred onto conveyor rolls 26 and 27 for movement between press members 31 and 32. The sheet is accurately located above the obliquely oriented female press member 32 in vertical alignment therewith when the leading edge of the sheet engages the spaced locator stops 38.

A photoelectric cell (not shown), or other suitable detection device, senses the entry of the glass sheet into the bending section 16 for initiating a bending cycle by energizing timing mechanisms which control the actions of the press actuating cylinder 68 and the subsequent retraction of the stop cylinders 41. When the leading edge of the glass sheet engages stops 38, cylinder 68 is actuated to raise the female mold member 32 upwardly to engage and then remove the sheet from conveyor rolls 27 and press the same against the male mold member 31 to shape sheet S into the desired curvature. During the upstroke of female mold member 32, cylinders 41 are actuated to retract stops 38 to permit advancement of the sheet when subsequently returned to the conveyor rolls 27.

The openings 80 and 81 in the press member side portions 65 and 66, respectively, provide the necessary clearance for the passage of female press member 32 past the rolls 27 upon vertical movement of the press. While openings 80 in the press member side portions 65 are necessary because of the askew orientation of the press member 32 relative to the rolls, these openings 80 are kept to a minimum by the provision of the specially configured rolls 27 of this invention, each of which is formed of two offset sections 70 and 71 joined together by a thin narrow connecting bar 78 extending perpendicularly to its associated press member side portion 65. Thus, only a minimum of the shaping surface is sacrificed and the integrity thereof is substantially preserved to accurately and precisely control glass deformation.

After the glass sheet has been shaped between the press members 31 and 32 to impart the desired curvature thereto, the female press member 32 is lowered below the conveyor rolls 27 to deposit the bent sheet thereon for advancement out of the bending section 16. The bent sheet is then advanced on rolls 26 and 27 at the proper rate of speed out of the bending section 16 and onto the successive conveyor rolls 28 for movement into and through the tempering section 17 between the opposed tubes 30 of blastheads 29 at a speed promoting the proper rate of cooling to obtain the desired temper in the sheets. When the trailing edge of the bent sheet leaves the last conveyor roll 26 in bending section 16, cylinders 41 are actuated by suitable control means to raise the stops 38 into their upper positions above the rolls 26 and 27 in readiness for the next bending cycle.

Another form of supporting and conveying apparatus of this invention, generally designated 120, is shown in FIGS. 5 through 10. The supporting and conveying apparatus 120 also is employed in the press bending area and comprises a pair of outer conveyor rolls 121, a series of specially configured, intermediate rolls 122 and a pair of inner rolls 123, which collectively move the sheets to be bent into and within the bending section 16 between a pair of irregularly shaped press members, hereinafter more fully described, and which impart the desired curvature to the sheets being processed. The rolls 122 are especially adapted for use in conjunction with female press members having complex, unusually shaped outlines, such as that defined by the shaping rail, generally designated 125, in the illustrative embodiment depicted in FIG. 6. Of course, the outline of female press shaping rail 125 and the countour of its shaping surface, as well as its complementary male press member shaping surface 126 (FIG. 5), conforms to and is dictated by the shape and marginal outline of the glass sheet to be bent.

Figure 5:
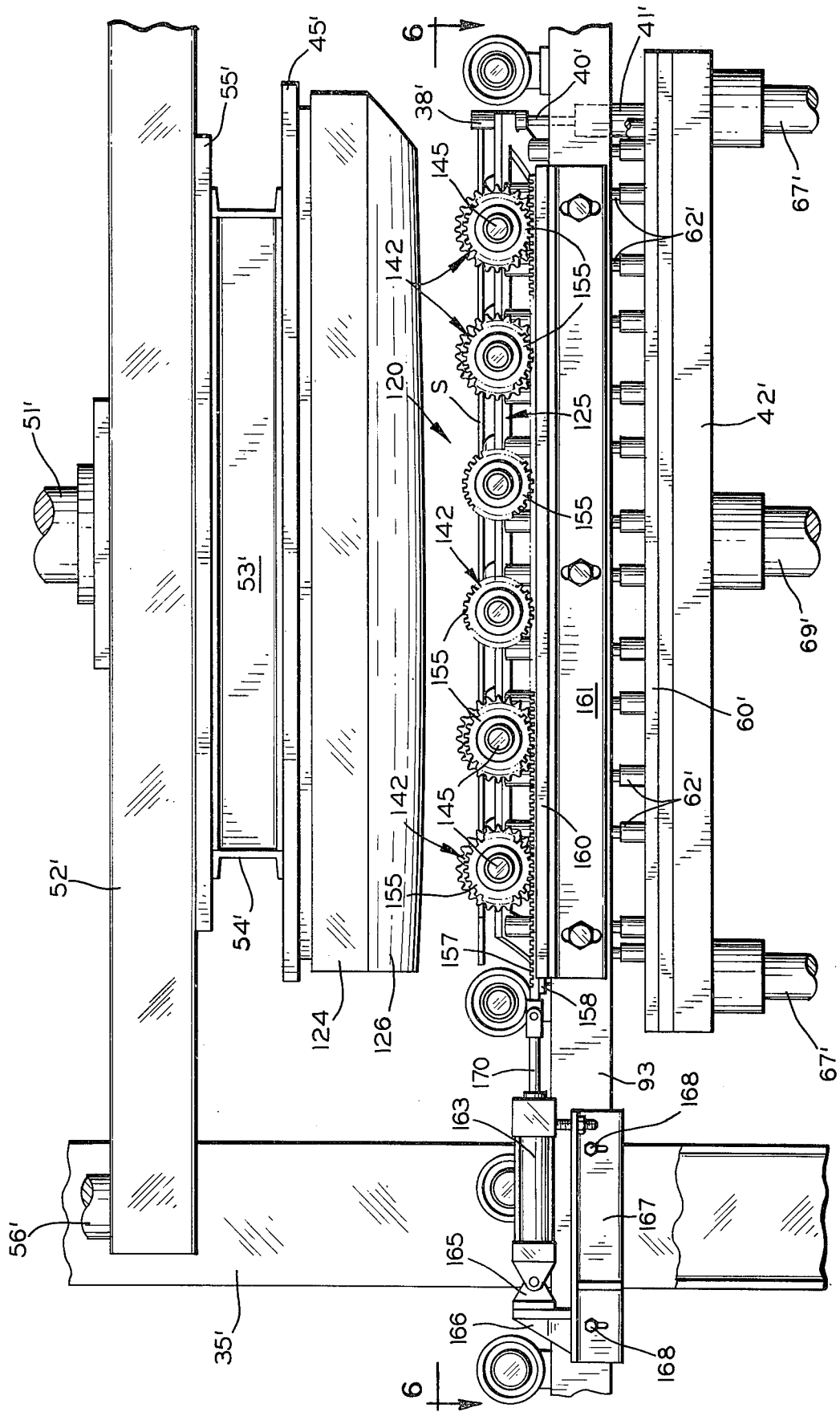
FIG. 5 is a side elevational view of a bending apparatus incorporating another form of a glass supporting and conveying apparatus constructed in accordance with this invention.

Other than the outline and contour of the shaping surfaces of male press member 124 and female shaping rail 125, the remaining support structure depicted in FIG. 5, although of different dimensions, is similar to that hereinbefore described in connection with the male and female press members 31 and 32 of the first form of the invention shown in FIGS. 1 through 4. Accordingly, it is believed that no further amplification or description of the male and female supporting structure is required, the same reference characters primed being applied to similar parts.

Figure 6:
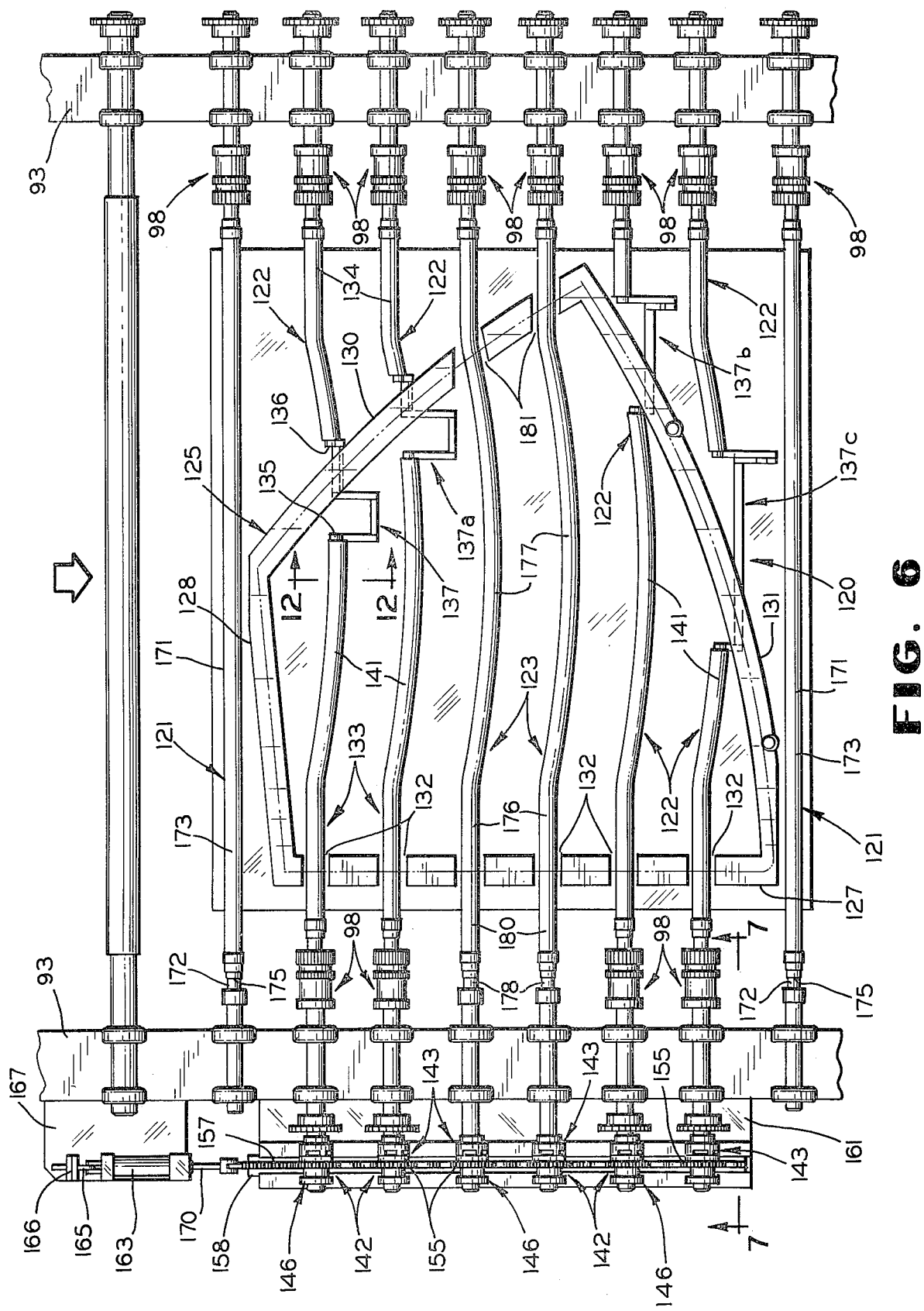
FIG. 6 is a top plan view of the form of apparatus of FIG. 5, looking in the direction of arrows 6—6 of FIG. 5.
Figure 7:
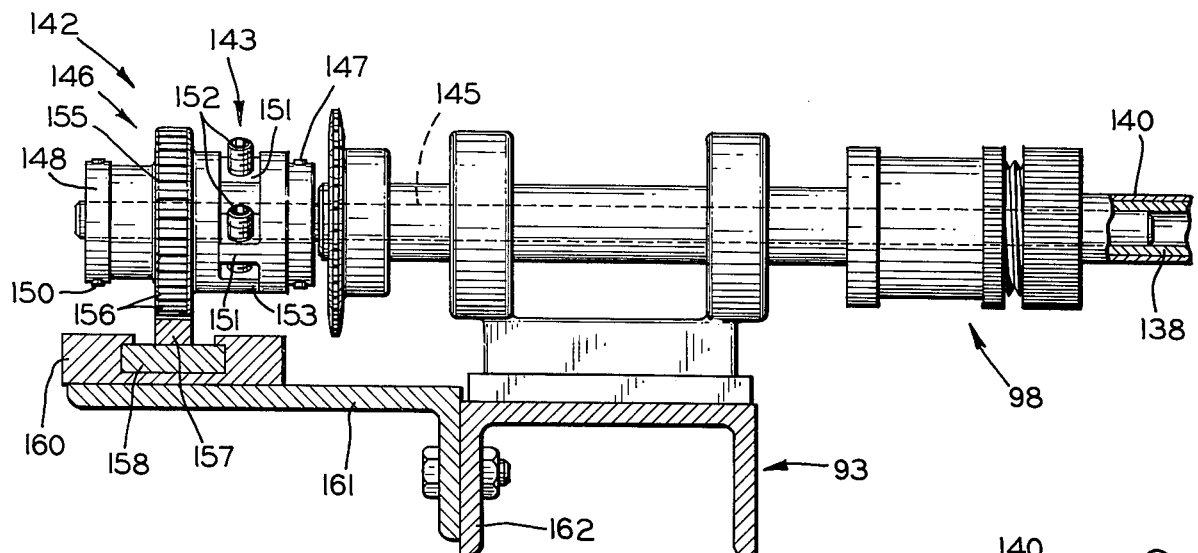
FIG. 7 is a vertical sectional view, on an enlarged scale, taken along line 7—7 of FIG. 6.

As shown in FIG. 6, the female press shaping rail 125 is formed of a long straight side portion 127 extending transversely of the conveyor rolls, a short straight side portion 128, and two curved side portions 130 and 131, respectively. Since the longer straight side portion 127 extends perpendicularly to the conveyor rolls, it can be formed with relatively small clearance spaces 132 for the passage of the rolls therethrough and does not adversely affect deformation control. The short straight side portion 128 can be readily accommodated between an outer roll 121 and the adjacent intermediate roll 122 so as not to interfere with the vertical displacement of the conveyor rolls at all. However, forming clearance spaces in either of the curved side portions 130 and 131 to accommodate passage of the conveyor rolls therethrough during relative vertical movement therebetween would require openings or gaps in these curved side portions 130, 131 well beyond tolerable limits and would permit portions of the heat-softened glass disposed above such gaps to sag by gravity therein to abort controlled shaping of the glass sheet.

The above problem is solved in this form of the invention by the use of the pivotal, specially configured, segmented conveyor rolls 122 employed in the bending area. As best shown in FIGS. 6 and 8-11, each conveyor roll 122 comprises two sections 133 and 134 joined together at their inner ends 135 and 136, respectively, by an irregularly shaped connector means 137–137c. Sections 133, 134 are somewhat similar to the sections 70, 71 of the conveyor roll 27 previously described in connection with the first form of the invention shown in FIGS. 2 and 3 in that each is formed of an inner core 138 and an outer load carrying sleeve 140 rotatable thereabout with each being connected, as by a coupling 98, to a drive train in the same manner as roll sections 70, 71. However, the overall shape of rolls 122 differ from the shape of rolls 27 in that the former are provided with arcuately shaped central portions 141 and their connector means 137–137c, hereinafter more fully described, differ in construction from the connector means 72 of the rolls 27.

Also, in addition to rotation about their own chordal axes, the rolls 122 are mounted for pivotal movement in unison between a first position in which the curved portions 141 thereof lie in a common horizontal plane as shown in FIG. 6, and a second or lower position in which these curved portions 141 are disposed in attitudes extending at angles to said common horizontal plane for conjointly defining a curved supporting surface complementary to the curvature imparted to the glass sheet. To this end, means are provided for shifting the rolls 122 between the two positions mentioned above, such means comprising a composite or two-piece coupling, generally designated 142 (FIG. 7), comprising a first coupling section 143 secured to a drive shaft 145 rigidly secured to the core member 138 of roll 122, and a second coupling section 146 operatively connected to a drive, as will presently become apparent.

Coupling section 143 is rigidly secured to shaft 145 by a retainer pin 147 while coupling section 146 is mounted on shaft 145 for free rotation thereabout but restrained against axial movement by means of a retaining collar 148 fixedly secured to shaft 145 by a retainer pin 150. Coupling section 143 is provided with a series of circumferentially spaced lugs 151 projecting axially outwardly therefrom toward coupling section 146. These lugs 151 are formed with tapped openings for receiving threaded adjusting screws 152 therethrough. Coupling section 146 also is provided with a series of circumferentially spaced lugs 153 projecting axially outwardly therefrom toward coupling section 143 and are offset from lugs 151 for reception in the spaces defined between the latter. Screws 152 are threaded, as required, to bring their respective inner ends into bearing engagement against lugs 153 and angularly orient the coupling sections 143 and 146 relative to each other to the angular extent required. The torque imparted to drive coupling section 146 is then transmitted directly to coupling section 143 via lugs 153, screws 152 and lugs 151.

The means for imparting rotary motion to coupling section 146 includes a pinion gear 155 welded or otherwise fixedly secured to coupling section 146 and provided with peripheral teeth 156 engaging and meshing with a gear rack 157 secured to the upper face of a slide 158. The slide 158 is guided for axial sliding movement in a guide block 160 suitably affixed to the horizontally extending leg of an angle member 161 bolted to one leg 162 (FIG. 7) of the structural member forming rail 93.

The means for actuating slide 158, and thereby gear rack 157, includes a fluid cylinder 163 (FIGS. 5 and 6) pivotally mounted at its head end to a lug 165 affixed to a bracket 166 secured to the horizontal leg of an angle member 167 secured, as by means of fasteners 168, along its vertical leg to the rail 93. Cylinder 163 is provided with the usual reciprocal piston (not shown) connected to a piston rod 170, in turn connected to the slide 158. Retraction of the piston rod 170 effects axial movement of the slide 158 and gear rack 157 toward the left, as viewed in FIG. 5, to rotate the several gears 155 in unison in a clockwise direction for shifting the central portions 141 of rolls 122 from their upper horizontal dispositions to their lower angular dispositions. For a more detailed description and illustration of the roll shifting means described above, reference may be had to U.S. Pat. No. 4,015,968, assigned to the same assignee as the present invention.

The outer conveyor rolls 121 located in the bending area consist of only one straight, elongated section 171 extending completely across the bending area. Similarly to the sections 133, 134 of conveyor rolls 122, each roll 121 is comprised of a fixed inner core 172 and an outer rotatable sleeve 173 which is driven for rotation, via coupling 98, from one end only as shown in FIG. 6. The other end of the sleeve 173 terminates in an end 175 inwardly of the associated end of core 172 for free rotation thereabout.

The inner conveyor rolls 123 located substantially centrally of the bending area also consist of only one section 176 extending across the bending area but are formed with arcuately shaped central portions 177 similarly to rolls 122. Each of these rolls 123 also is formed of an inner core 178 and an outer rotatable sleeve 180 driven from one end only. However, the other ends of rolls 123 are connected through couplings 142 to the roll shifting means for pivotal movement in unison along with conveyor rolls 122.

In order to permit displacement of the female shaping rail 125 from a position below conveyor rolls 122, 123 to a level thereabove to effect press bending, the long straight side 127 is segmented to provide the necessary clearance spaces 132 for the rolls as hereinbefore mentioned, and the short straight side portion 128 is positioned between adjacent rolls 121 and 122. However, because of the orientation of the curved side portions 130 and 131 relative to the rolls they intersect, the required clearance spaces would have to be elongated and, if provided for all the rolls, would drastically impair the integrity of the shaping rail to the extent that the latter could not adequately support nor properly shape the heat-softened glass sheet. As a result, only two clearance spaces 181 are formed in curved side portion 130 to accommodate the inner rolls 123 while none are provided in the curved side portion 131.

In order to accommodate vertical displacement of the female shaping rail 125 relative to the rolls, the connector means 137-137c of the respective rolls 122 are located in the regions that would otherwise be intersected by the rail 125 and are configured in a manner to be displaced out of the way when pivoted along with their associated rolls.

As shown in FIGS. 6 and 8-11, the specific construction of the various connector means 137-137c can vary and differently shaped connectors are identified by letter subscripts. The two connector means 137 and 137a located in the forward portion of the bending area are similar in construction and each comprises a pair of opposed lugs 182 and 183 connected at their one ends to the core inner ends 135 and 136 of roll sections 133 and 134, respectively. These lugs extend in a direction generally normal to the axis of the associated roll and preferably are angularly offset from each other approximately 90°. The other ends of lugs 182 and 183 are connected to the opposite ends of a cross member, generally designated 185, which is comprised of a pair of straight bars 186 and 187 extending generally perpendicularly of and inwardly from the other ends of lugs 182 and 183 and joined at their inner ends to the opposite ends of an arcuately shaped tie bar 188. The cross member 185 is pivotal along with the arcuately curved portion 141 of its associated roll 122 between the normal position shown in FIGS. 8 and 12 and an alternate position shown in FIGS. 9 and 13. The only difference between connector means 137 and 137a is that the bar 187 of the latter is shorter than the bar 187 of the former.

Figure 10:
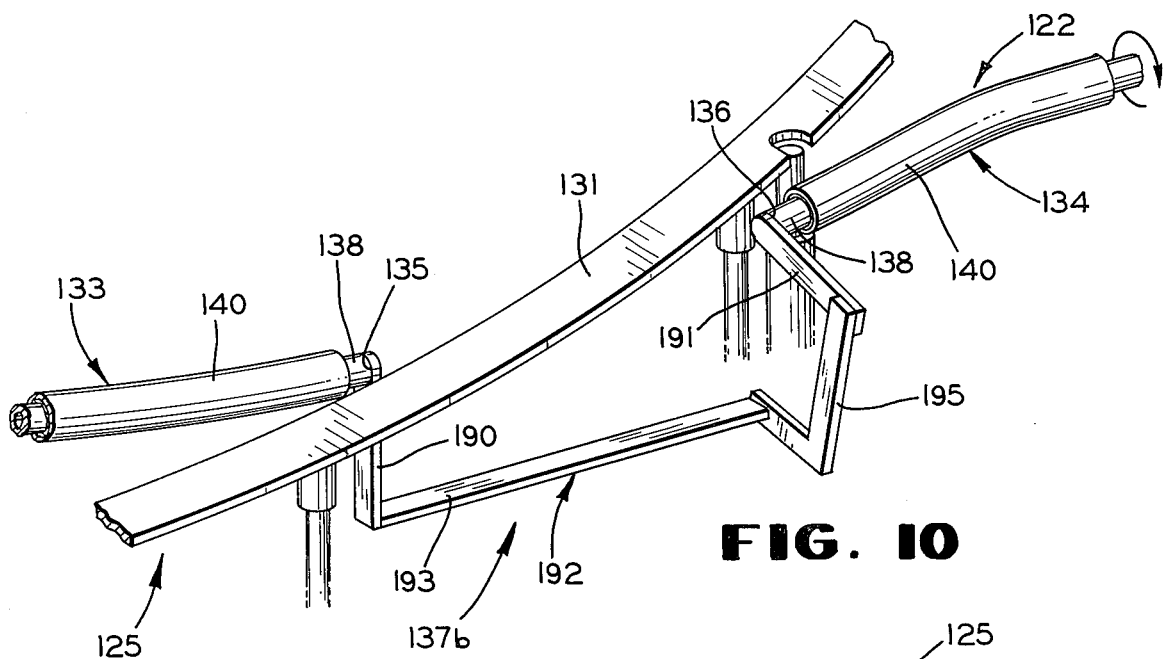
FIG. 10 is a perspective view of another of the specially configured, pivotal rolls of FIG. 6, showing the roll in position to support a flat glass sheet.
Figure 11:
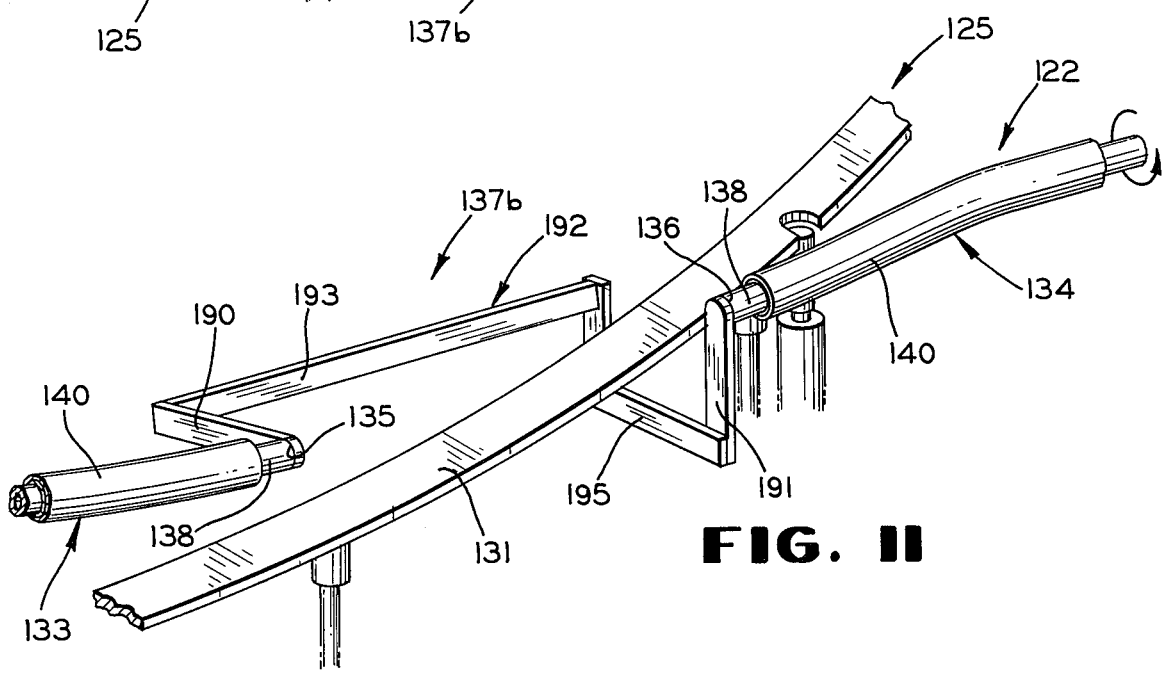
FIG. 11 is a view similar to FIG. 10, showing the roll in an alternate lower position for supporting a bent glass sheet.

The connector means, identified by reference character 137c in FIGS. 6, 10 and 11, comprises a pair of opposed lugs 190 and 191 connected at their one ends to the core inner ends 135 and 136 of roll sections 133 and 134, respectively, and preferably are angularly offset from each other about 90°. The other ends of lugs 190 and 191 are connected to the opposite ends of a cross member 192 comprised of a straight bar portion 193 connected at its one end to the other end of lug 190 and extending generally perpendicularly and inwardly therefrom. The other end of bar 193 is joined to the other end of lug 191 by an angle tie bar 195. Cross member 192 is pivotal along with the arcuately curved portion 141 of its associated roll between the position shown in FIG. 10 and an alternate position shown in FIG. 11. The connector means, identified as 137b in FIG. 6, is similar in construction to and operative in the same manner as connector means 137c except that the straight bar portion 193 of the former is shorter than the straight bar portion 193 of connector means 137b.

As earlier mentioned, the specific construction of the various connector means 137-137c may vary, as determined by their location relative to the shaping rail 125. However, they serve a common purpose in providing stability for the rolls 122 by their rigid connection to the roll core inner ends while being configurated in a manner avoiding contact or interference with the shaping rail 125 of the female press member during vertical displacement thereof relative to the conveyor rolls 122.

Figure 8:
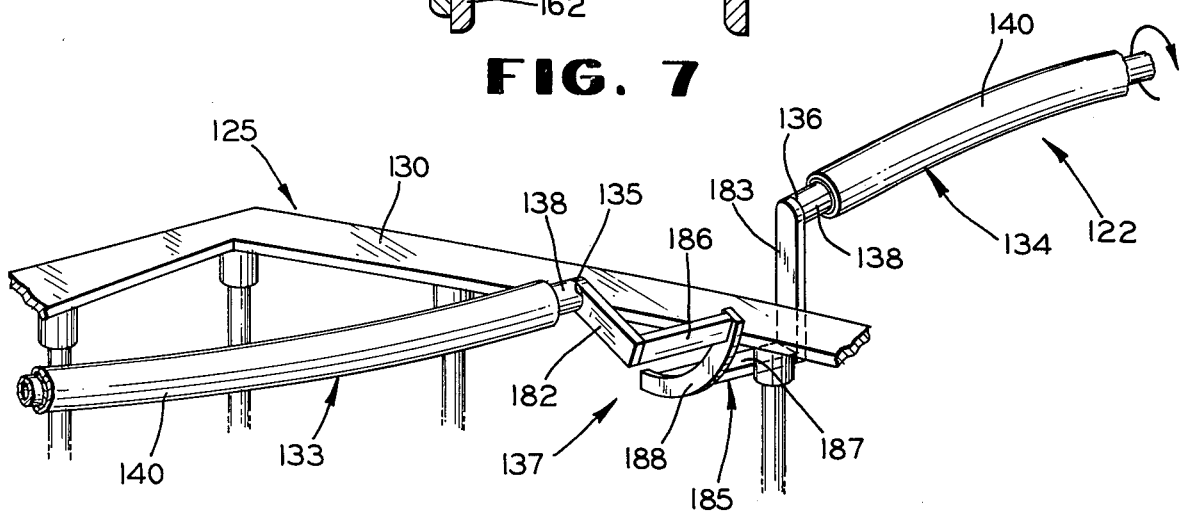
FIG. 8 is a perspective view of one of the specially configured, pivotal rolls of FIG. 6, showing the roll in position to support a flat glass sheet.
Figure 9:
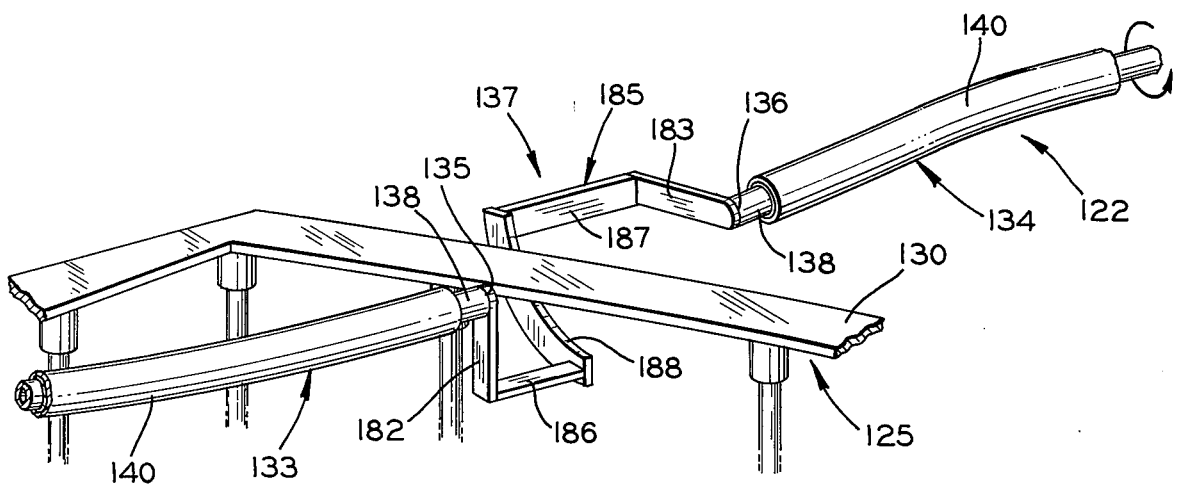
FIG. 9 is a view similar to FIG. 8, showing the roll in its alternate lower position for supporting a bent glass sheet.

In operation, the central curved portions 141 and 177 of rolls 122 and 123, respectively, are initially disposed in their upper position wherein they lie in a common horizontal plane (FIG. 6) to support a heated flat glass sheet entering the bending section 16. With the roll central portion 141 and 177 in this common horizontal position, connector means 137 is disposed in the position shown in FIGS. 8 and 12 with the shaping rail 125 disposed below the arcuately curved portions 141 and 177. The curved side portion 130 of shaping rail 125, as shown in FIG. 8, is accommodated in the pocket defined by members 183, 187 and tie bar 188 of connector means 137. Also, the shaping rail side portion 131 (FIG. 10) is disposed in the pocket formed by members 190, 193 and tie bar 195 of connector means 137b for example, curving around the outside of the now vertical extending lug 190 and forwardly of the inside of tie bar 195.

The gear rack 157 is adapted to be actuated simultaneously with upward movement of the female press member so that the rolls 122, 123 are pivoted downwardly into angular attitudes or planes relative to the aforementioned common horizontal plane out of engagement with the glass sheet just as the marginal edge portions of the sheet are engaged by the shaping rail 125 to lift the same upwardly. At the same time, connector means 137–137c are swung along with the roll central portions 141 into their alternate, out-of-the way positions to preclude contact with the shaping rail 125 during initial ascent of the latter and upon its descent below the level of the roll central portions 141 and 177 when in their lower attitudes. When the bent sheet is returned to the conveyor rolls 122, 123 after bending, the roll curved portions 141, 177 conjointly define a curved surface complementary to the curvature imparted to the sheet and preclude any sagging out of the desired curvature as the bent sheet is conveyed out of the bending section 16.

Figure 12:
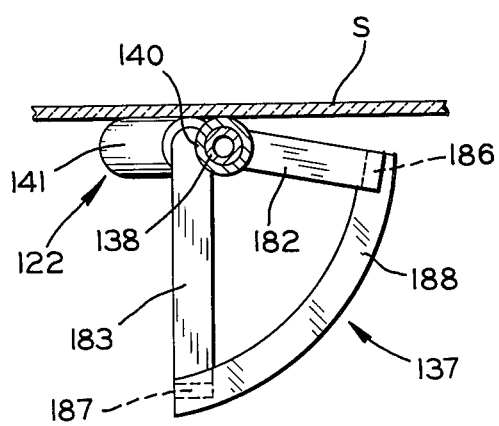
FIG. 12 is a vertical sectional view, on an enlarged scale, taken along the line 12—12 of FIG. 6, showing one position of the conveyor roll.
Figure 13:
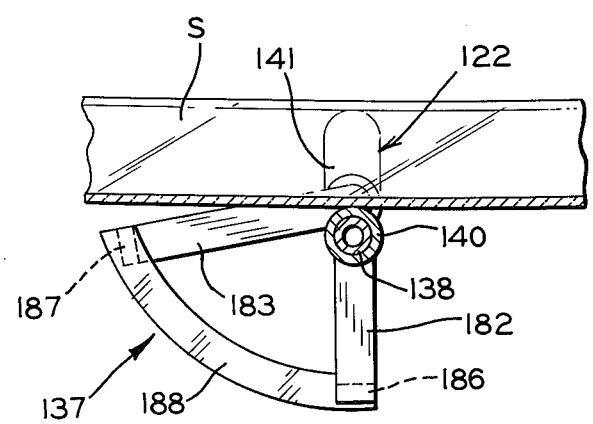
FIG. 13 is a view similar to FIG. 12, showing an alternate position of the conveyor roll.

As shown in FIG. 13, the entire connector means 137 has been bodily lowered, as well as pivoted during pivotal movement of the roll central portion 141, from the position shown in FIG. 12 to that of FIG. 13, placing the curved portion 130 (FIG. 9) of the now lowered shaping rail 125 in the pocket formed by members 182, 186 and tie bar 188 of connector means 137. Also, the shaping rail side portion 131 (FIG. 11) now curves behind the major portion of connector means 137b, which has been swung into its alternate position, and through the pocket defined by the angle tie bar 195 and member 191.

It should be understood that the degree of curvature imparted to the central portions 141 and 177 of conveyor rolls 122 and 123, respectively, as well as the specific configuration of connector means 137–137c, is dictated by the desired curvature formed in the glass sheet and may vary, as desired. Because of the flexibility of the rolls 122 and 123, they can be initially bent to any desired geometrical form, including angular or V-shaped bends, to conform to the shape of the bent glass sheet being produced in a given production run and can be replaced by differently shaped rolls provided with diversely configurated connector means when bending glass sheets of different configurations. Once bent into the desired shape, the rolls are sufficiently rigid to remain set in this shape and will not be deformed out of such shape by the loading of the glass sheets thereon.

From the foregoing, it is apparent that the objects of the invention have been fully accomplished. As a result of this invention, an improved apparatus is provided for supporting and conveying glass sheets between narrow and/or irregularly shaped press members in a manner avoiding interference with the supporting and shaping function of the lower press member during relative vertical movement therebetween. This is effected by the provision of uniquely shaped conveyor rolls, each formed of two sections individually driven but rigidly interconnected in a manner requiring only a minimum of roll clearance spaces in the associated press shaping rail to accommodate vertical displacement thereof between lower and upper positions below and above the conveyor rolls. In one form of the invention, the two sections of each roll are connected at their offset inner ends by a thin connecting bar extending normal to the shaping rail at the region of intersection therewith. In another form of this invention, the inner ends of the two sections are joined together by an irregularly shaped connector pivotable between two alternate out-of-the way positions to avoid contact with the shaping rail during raising and lowering of the latter.

It is to be understood that the forms of the invention herewith shown and described are to be taken as illustrative embodiments only of the same, and that various changes in the shape, size and arrangement of parts may be resorted to without departing from the spirit of the invention.

I claim:

1. A conveyor roll comprising: a pair of elongated sections, each section formed of an inner core and an outer rotatable load supporting sleeve mounted on said core for rotation thereabout, said cores including outer ends having a common axis and inner ends axially offset from each other, means interposed between said core inner ends for connecting said inner ends together to form a unitary one piece construction of irregular angular shape, said sleeves having inner ends terminating inwardly of said core inner ends for free rotation about said cores, respectively, and drive means connected to the outer ends of said sleeves for rotating said sleeves in unison.

2. A conveyor roll according to claim 1, wherein said connecting means comprises a relatively thin bar rigidly secured adjacent the opposite ends thereof to the inner ends of said cores.

3. A conveyor roll according to claim 1, wherein one of said sections extends in a true linear direction and the other section includes a straight portion lying in said common axis and a bent portion extending at an angle from said common axis.

4. A series of conveyor rolls according to claim 1, in combination with apparatus for bending a glass sheet including a bending member having an upwardly facing shaping surface thereon, said conveyor rolls supporting a glass sheet above said shaping surface in position to be engaged thereby, means for moving said bending member upwardly to engage the marginal edge portions of said glass sheet and lift the same from said conveyor rolls to effect bending of said glass sheet, said shaping surface having relatively narrow spaces to provide clearance for passage of said roll connecting means therethrough upon vertical movement of said bending member relative to said rolls.

5. The combination according to claim 4, wherein said bending member is of an outline ring-type construction having a shaping rail of generally rectangular configuration in plan with two opposite long side portions and two opposite short side portions to accommodate elongated, narrow glass sheets.

6. The combination according to claim 5, wherein the longitudinal axis of said shaping rail is oriented at an angle to said roll common axis.

7. The combination according to claim 6, wherein one of said sections of each roll is bent to extend in spaced parallel relation to one of the long side portions of said shaping rail.

8. The combination according to claim 7, wherein said connecting means of each roll comprises a relatively thin bar extending substantially perpendicularly to a long side portion of said shaping rail and each of said shaping rail side portions is provided with only one small clearance space in vertical alignment with said thin bar to permit vertical movement of said shaping rail past said conveyor rolls.

9. A conveyor roll according to claim 1, wherein said connecting means comprises an irregularly shaped connector formed of a plurality of angularly related members.

10. A conveyor roll according to claim 9, wherein said connector comprises a pair of lugs connected at the one ends thereof to said core inner ends and extending substantially perpendicularly therefrom, and a cross member joining the other ends of said lugs together.

11. A conveyor roll according to claim 10, wherein said cross member includes a pair of parallel but axially offset bars extending perpendicularly and inwardly from the other ends of said lugs and an arcuately shaped tie bar connecting said axially offset bars together.

12. A conveyor roll according to claim 11, wherein said cross member includes an elongated straight bar extending perpendicularly and inwardly from the other end of one of said lugs and an angle tie bar connecting said straight bar to the other end of the other lug.

13. A series of conveyor rolls according to claim 9, in combination with apparatus for bending a glass sheet including a bending member having a shaping rail provided with an upwardly facing shaping surface thereon, said conveyor rolls supporting a glass sheet above said shaping surface in position to be engaged thereby, means for moving said bending member upwardly to engage the marginal edge portions of said glass sheet and lift the same from said conveyor rolls to effect bending of said glass sheet, said conveyor rolls having arcuately shaped central portions, and means for pivoting said conveyor rolls to displace said roll central portions from a common plane supporting said glass sheet prior to bending to angular positions defining a supporting surface complementary to the shape imparted to said sheet after the bending thereof.

14. The combination according to claim 13, wherein said roll section connectors are pivotable along with said roll central portions between first and second positions.

15. The combination according to claim 14, wherein said plurality of angularly related members define a pair of pockets adapted to alternatively receive portions of said shaping rail in the lowered position thereof beneath the roll central portions when in their common plane prior to bending and when in their lower angular positions after bending, respectively.

* * * * *